H. W. G. THRASHER.
WAGON BRAKE.
APPLICATION FILED JUNE 15, 1917.

1,249,250.

Patented Dec. 4, 1917.

Inventor
H. W. G. Thrasher

Witnesses

UNITED STATES PATENT OFFICE.

HENRY WM. G. THRASHER, OF CARROLLTON, ALABAMA.

WAGON-BRAKE.

1,249,250.  Specification of Letters Patent.  Patented Dec. 4, 1917.

Application filed June 15, 1917. Serial No. 174,971.

*To all whom it may concern:*

Be it known that I, HENRY WM. G. THRASHER, a citizen of the United States, residing at Carrollton, in the county of Pickens and State of Alabama, have invented certain new and useful Improvements in Wagon-Brakes; and I do hereby declare the following to be a full, clear, and exact description of the invention, such as will enable others skilled in the art to which it appertains to make and use the same.

This invention relates to wagon brake mechanism, and an object of the invention is the provision of a brake mechanism designed particularly to be employed on a log wagon, and so constructed that it will be efficient and can be conveniently operated.

Another object of the invention is to provide a wagon brake which is of simple and durable construction, and formed of a comparatively few parts, said parts being arranged in a convenient and compact manner.

Figure 1:
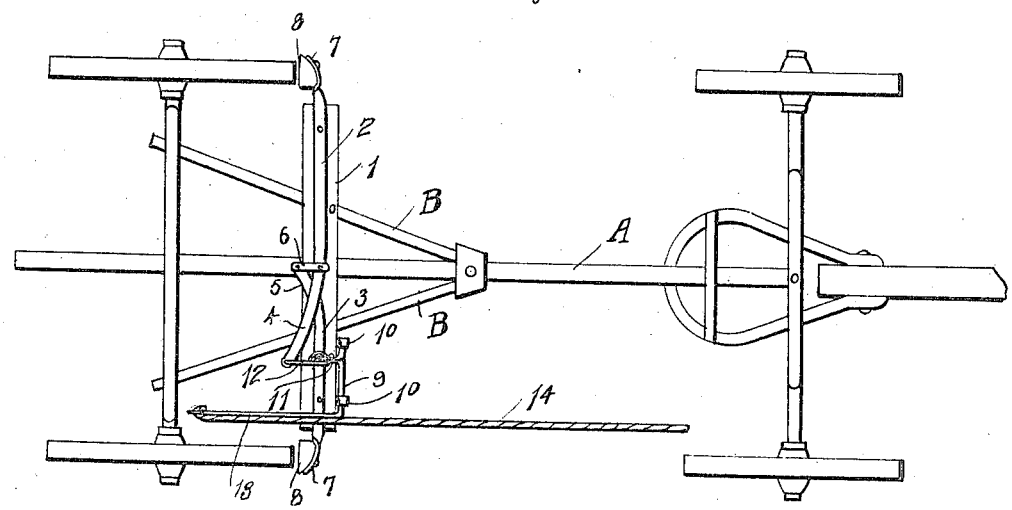
Figure 2:
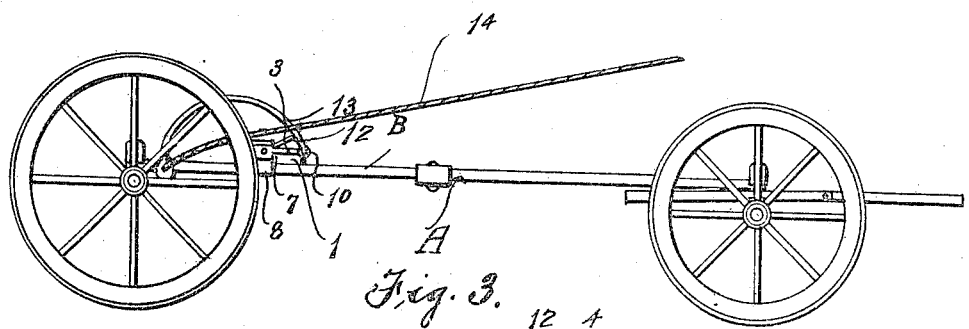
Figure 3:
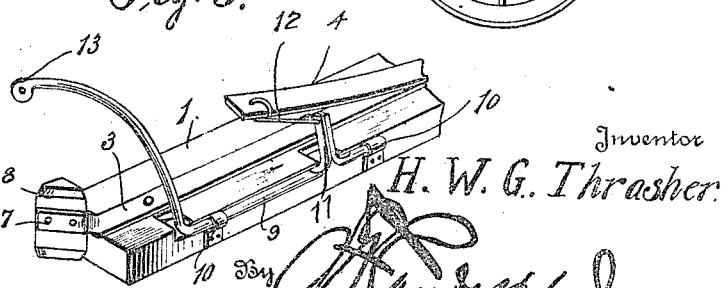

Other objects will appear and be better understood from that embodiment of my invention of which the following is a specification, reference being had to the accompanying drawing forming a part thereof, in which:

Figure 1 is a top plan view of the frame of a log wagon body with the improved brake mechanism mounted thereon, Fig. 2 is a side elevation of the wagon body frame, with the improved brake mechanism mounted thereon, and Fig. 3 is a detail perspective view of one end of the brake mechanism.

Referring to the drawing in detail, the letter A designates, as an entirety, a log wagon frame which includes the usual rear hounds B.

Resting on, and extending transversely across the rear hounds B is an elongated body 1, which is formed, preferably, of wood. Mounted on the upper side of the body 1 is a relatively long lever 2 and a relatively short lever 3. The levers 2 and 3 normally lie in parallelism with the body 1, and are pivoted to the body 1 adjacent the ends of the body, as shown more particularly in Fig. 1 of the drawing. The inner ends of the levers 2 and 3 intersect, as shown in Fig. 1, and said inner ends are curved rearwardly and they are respectively designated by the numerals 4 and 5. The inner end 5 of the relatively short lever 3 is located at a point substantially in line with the center of the body 1 and has connection with the lever 2 by means of a link 6. The outer ends of the levers 2 and 3 project beyond the ends of the body 1 and are formed to provide rearwardly curved attaching flanges 7, which are secured to a pair of brake shoes 8 arranged in opposing relation with the rear wheels of a wagon. A relatively short shaft 9 is journaled in bearings 10 carried by the forward side of the body 1, said shaft being located at one end of the body 1 and is provided with an upwardly and rearwardly projecting finger 11, which has connection with the terminal of the curved end 4 of the lever 2 by means of a link 12. The outer end of the shaft 9 has integrally secured thereto an arcuate shaped arm 13, which extends in the direction of the rear axle of the wagon and the said arm 13 has connection with one end of an operating rope 14, the said rope being extended forwardly of the wagon and is adapted to be tied to the forward portion of the wagon or thrown into the wagon box (not shown) or anywhere that may suit the convenience of the operator.

When the rope 14 is moved forwardly the same will raise the arm 13 upwardly, this upward movement of the arm 13 resulting in the shaft 9 being rotated in the direction where it will cause forward movement of the curved end 4 of the relatively large lever 2, and also effect forward movement of the curved end 5 of the relatively small lever 3. When the curved ends 4 and 5 of the levers 2 and 3 are thence moved forwardly, the outer ends of the levers 2 and 3 will be moved rearwardly and effect engagement between the brake shoes 8 and the rear wheels of the wagon.

It is evident that various changes might be resorted to in the form, construction and arrangement of the several parts without departing from the spirit and scope of the invention as claimed.

Having thus described my invention what I claim as new, is:

1. A wagon brake including an element adapted to be mounted on a wagon body, a pair of levers pivotally mounted on the element, brake shoes carried by the levers, a rotatable shaft mounted on the element, means for operatively connecting the levers to each other, and means for connecting the rotatable shaft to one of the levers, whereby to effect movement of the levers when the shaft is rotated.

2. A wagon brake including a pair of levers, brake shoes carried by the levers, means for operatively connecting the levers to each other, a rotatable shaft operatively connected with one of the levers and adapted when operated to effect movement of the levers, an arm carried by the shaft, and manipulating means connected to the arm.

3. A wagon brake including an element adapted to be mounted on the body of the wagon, a relatively long and relatively short lever pivotally mounted on the element, brake shoes carried by the levers, a link connecting the levers to each other, a rotatable shaft, and means connecting the rotatable shaft to the relatively long lever whereby to effect movement of the levers when the shaft is rotated.

4. A wagon brake including an element adapted to be mounted on the body of a wagon, a pair of levers mounted on and extending parallel with the element and each having one end projecting outwardly beyond the element, brake shoes carried by the outer ends of the levers, the said levers having their inner ends curved and arranged in intersecting relation, means for connecting the inner curved end of one of the levers to the other lever, a rotatable shaft journaled on the element, means for connecting the rotatable shaft to the inner curved end of the last-mentioned levers, and manipulating means for the shaft.

5. A wagon brake including an element adapted to be mounted on a wagon, a pair of levers pivotally associated with the element, brake shoes carried by the levers, means for connecting the levers to each other, a rotatable shaft, means for connecting the rotatable shaft to one of the levers so as to effect movement of the levers when the shaft is rotated, an arcuate shaped arm carried by the shaft, and manipulating means connected to the arcuate shaped arm.

In testimony whereof I affix my signature in presence of two witnesses.

HENRY WM. G. THRASHER.

Witnesses:
TROY ELMORE,
W. R. CUMMINS.

Copies of this patent may be obtained for five cents each, by addressing the "Commissioner of Patents, Washington, D. C."